United States Patent
Xu et al.

(10) Patent No.: US 12,204,392 B2
(45) Date of Patent: Jan. 21, 2025

(54) ELECTRONIC DEVICE AND METHOD FOR CONTROLLING UPDATE OF DATA IN ELECTRONIC DEVICE

(71) Applicant: OMRON Corporation, Kyoto (JP)

(72) Inventors: Lei Xu, Kyoto (JP); Yutao Wang, Shanghai (CN); Liangyong Duan, Shanghai (CN); Xianjie Guo, Shanghai (CN)

(73) Assignee: OMRON CORPORATION, Kyoto (JP)

( * ) Notice: Subject to any disclaimer, the term of this patent is extended or adjusted under 35 U.S.C. 154(b) by 62 days.

(21) Appl. No.: 18/019,359

(22) PCT Filed: Aug. 2, 2021

(86) PCT No.: PCT/CN2021/109980
§ 371 (c)(1),
(2) Date: Feb. 2, 2023

(87) PCT Pub. No.: WO2022/028350
PCT Pub. Date: Feb. 10, 2022

(65) Prior Publication Data
US 2023/0266808 A1 Aug. 24, 2023

(30) Foreign Application Priority Data
Aug. 6, 2020 (CN) .......................... 202010782262.3

(51) Int. Cl.
*G06F 1/30* (2006.01)
*G06F 8/65* (2018.01)

(52) U.S. Cl.
CPC . *G06F 1/30* (2013.01); *G06F 8/65* (2013.01)

(58) Field of Classification Search
CPC ... G06F 1/30; G06F 8/65; G06F 21/57; G06F 11/2015
See application file for complete search history.

(56) References Cited

U.S. PATENT DOCUMENTS

| | | | |
|---|---|---|---|
| 6,907,602 B2 * | 6/2005 | Tsai | G06F 8/65 717/168 |
| 2011/0078435 A1 * | 3/2011 | Krieger | G06F 1/26 713/100 |

(Continued)

FOREIGN PATENT DOCUMENTS

| | | |
|---|---|---|
| CN | 202340269 U | 7/2012 |
| CN | 102945210 A | 2/2013 |

(Continued)

OTHER PUBLICATIONS

JPO Notice of Reasons for Refusal for corresponding JP Application No. 2023-507519; Dated Jan. 16, 2024; 15 pages.

(Continued)

*Primary Examiner* — Hyun Soo Kim
(74) *Attorney, Agent, or Firm* — CANTOR COLBURN LLP

(57) ABSTRACT

The present disclosure provides an electronic device and a method for controlling data updates of the electronic device, the electronic device comprising: a control portion including a storage configured to store data and a controller configured to control data updates in the storage; a power supply portion; a power storage portion configured to be connected with the power supply portion, receive and store electric power of the power supply portion, and supply the electric power to the control portion; and a power supply detection portion configured to detect whether the power supply portion supplies power normally, the storage includes a first storage portion configured to store start-up data for electronic device start-up and a second storage portion configured to store running data for electronic device running after start-up; in the process of updating the start-up data of the first storage portion, if the power supply detection portion detects the power supply portion has a power supply abnormality, the controller controls the storage to complete the (Continued)

process of updating the start-up data by using the electric power stored in the power storage portion.

7 Claims, 6 Drawing Sheets

(56) References Cited

U.S. PATENT DOCUMENTS

| | | | | |
|---|---|---|---|---|
| 2012/0239920 A1* | 9/2012 | Yang | ............... | G06F 8/65 |
| | | | | 713/2 |
| 2013/0332914 A1* | 12/2013 | Goda | ............... | G06F 8/65 |
| | | | | 717/168 |
| 2014/0208092 A1* | 7/2014 | Huang | ............... | G06F 8/654 |
| | | | | 713/2 |
| 2016/0011887 A1* | 1/2016 | Chung | ............... | G06F 8/654 |
| | | | | 713/2 |
| 2018/0373524 A1* | 12/2018 | Kazi | ............... | G06F 1/263 |
| 2019/0265964 A1 | 8/2019 | Koike | | |

FOREIGN PATENT DOCUMENTS

| | | | | |
|---|---|---|---|---|
| CN | 108762789 A | * | 11/2018 | |
| CN | 110597665 A | | 12/2019 | |
| CN | 111880638 A | | 11/2020 | |
| EP | 3588245 A1 | | 1/2020 | |
| JP | 2015064726 A | | 4/2015 | |
| JP | 2018156638 A | | 10/2018 | |
| JP | 2019149118 A | | 9/2019 | |
| TW | 200937290 A | * | 9/2009 | .......... G06F 11/1433 |

OTHER PUBLICATIONS

International Search Report for International Application No. PCT/CN2021/109980; Date of Mailing, Nov. 3, 2021.

PCT Written Opinion of the International Searching Authority for International Application No. PCT/CN2021/109980; Dabe of Mailing, Mar. 11, 2021.

EPO Extended European Search Report for corresponding EP Application No. 21852824.8; Issued Jul. 5, 2024; 42 pages.

* cited by examiner

ELECTRONIC DEVICE AND METHOD FOR CONTROLLING UPDATE OF DATA IN ELECTRONIC DEVICE

CROSS REFERENCE TO RELATED APPLICATIONS

This is the U.S. national stage of application No. PCT/CN2021/109980, filed on Aug. 2, 2021. Priority under 35 U.S.C. § 119 (a) and 35 U.S.C. § 365 (b) is claimed from Chinese Application No. 202010782262.3, filed Aug. 6, 2020, the disclosure of which is also incorporated herein by reference.

TECHNICAL FIELD

The present disclosure relates to the technical field of electronic circuits.

BACKGROUND ART

A storage of an electronic device usually stores data related to start-up and running of the electronic device, these data are e.g. firmwares. A firmware generally includes a drive program of the electronic device, stored inside the electronic device. Through the firmware, an operating system is able to implement running actions of a specific machine in accordance with a standard device driver. For example, a CD driver or burner, etc. has internal firmwares.

The above data related to start-up and running of the electronic device can be updated, thereby enabling to achieve an effect of repairing a defect of the electronic device and/or improving the performance of the electronic device, etc.

It should be noted that the above introduction to the Background is just to facilitate a clear and complete description of the technical solution of the present disclosure, and is elaborated to facilitate the understanding of persons skilled in the art. It cannot be considered that the above technical solutions are known by persons skilled in the art just because these solutions are elaborated in the Background of the present disclosure.

SUMMARY OF INVENTION

Technical Problem

The inventor of the present disclosure finds that in prior arts, in a process of updating the above data related to start-up and running of the electronic device, if a power supply portion of the electronic device is suddenly powered off due to a failure or power depletion, etc., the process of updating is then interrupted, and when the power supply is restored, it is possible that the electronic device may not start up normally, but rather the above data needs to be updated again using a special device, and the electronic device can start up normally only after the update is completed.

Solution to Problem

In order to solve the above problem and other similar problems, the embodiments of the present disclosure provides an electronic device and a method for controlling data updates of the electronic device. In the electronic device of the present disclosure, a storage portion comprises a first storage portion configured to store start-up data and a second storage portion configured to store running data, and if the power supply portion has a power supply failure in the process of updating the start-up data, the first storage portion can continue to complete updating of the start-up data by using electric power provided by a power storage portion in the electronic device. Thereby, even if the power supply portion has a failure when the electronic device is updating the start-up data, updating of the start-up data can be completed smoothly, thus ensuring that the electronic device can start up normally after the power supply portion supplies power normally.

According to one aspect of the embodiments of the present disclosure, an electronic device is provided and comprises:
    a control portion including a storage configured to store data and a controller configured to control data updates in the storage;
    a power supply portion;
    a power storage portion configured to be connected with the power supply portion, receive and store electric power of the power supply portion, and supply the electric power to the control portion; and
    a power supply detection portion configured to detect whether the power supply portion supplies power normally,
    the storage includes a first storage portion configured to store start-up data for electronic device start-up and a second storage portion configured to store running data for electronic device running after start-up, and in the process of updating the start-up data of the first storage portion, if the power supply detection portion detects the power supply portion has a power supply abnormality, controlling, by the controller, the storage to complete the process of updating the start-up data by using the electric power stored in the power storage portion.

According to another aspect of the embodiments of the present disclosure, a method for controlling data updates of the electronic device is provided, the electronic device comprising:
    a control portion including a storage configured to store data and a controller configured to control data updates in the storage;
    a power supply portion;
    a power storage portion configured to be connected with the power supply portion, receive and store first electric power of the power supply portion, and supply second electric power to the control portion; and
    a power supply detection portion configured to detect whether the power supply portion supplies power normally,
    the storage includes a first storage portion configured to store start-up data for electronic device start-up and a second storage portion configured to store running data for electronic device running after start-up,
    the method comprises:
    in the process of updating the start-up data of the first storage portion, if the power supply detection portion detects the power supply portion has a power supply abnormality, controlling, by the controller, the storage to complete the process of updating the start-up data by using the electric power stored in the power storage portion.

One of the advantageous effects of the embodiments of the present disclosure lies in: if the power supply portion has a power supply failure in the process of updating the start-up data, the first storage portion can continue to complete updating of the start-up data by using electric power provided by a power storage portion in the electronic device, thereby, even if the power supply portion has a failure when the electronic device is updating the start-up data, updating of the start-up data can be completed smoothly, thus ensuring that the electronic device can start up normally after the power supply portion supplies power normally.

Referring to the later description and figures, specific embodiments of the present disclosure are disclosed in detail, indicating a manner that the principle of the present disclosure can be adopted. It should be understood that the embodiments of the present disclosure are not limited in terms of the scope. Within the scope of the spirit and terms of the appended claims, the embodiments of the present disclosure include many changes, modifications and equivalents.

Features that are described and/or illustrated with respect to one embodiment may be used in the same way or in a similar way in one or more other embodiments and in combination with or instead of the features of the other embodiments.

It should be emphasized that the term "comprise" when being used herein refers to the presence of a feature, a whole piece, a step or a component, but does not exclude the presence or addition of one or more other features, whole pieces, steps or components.

BRIEF DESCRIPTION OF DRAWINGS

The included figures are used to provide a further understanding on the embodiments of the present disclosure, constitute a part of the Description, are used to illustrate the embodiments of the present disclosure, and expound together with the text description the principle of the present disclosure. Obviously, the figures in the following description are only some embodiments of the present disclosure. Persons skilled in the art can also obtain other figures based on the these figures under the premise that they do not pay inventive labor. In the figures.

DESCRIPTION OF EMBODIMENTS

Referring to the figures, through the following Description, the above and other features of the present disclosure will become obvious. The Description and figures specifically disclose particular implementations of the present disclosure, showing partial implementations which can adopt the principle of the present disclosure. It should be understood that the present disclosure is not limited to the described implementations, on the contrary, the present disclosure include all the modifications, variations and equivalents falling within the scope of the attached Supplements. Various implementations of the present disclosure will be described below with reference to the figures. These implementations are only exemplary and do not limit on the embodiments of the present disclosure.

In the embodiments of the present disclosure, the term "first" and "second", etc. are used to distinguish different elements in terms of appellation, but do not represent a spatial arrangement or time sequence, etc. of these elements, and these elements should not be limited by these terms. The term "and/or" includes any and all combinations of one or more of the associated listed terms. The terms "comprise" and "have", etc. refer to the presence of stated features, elements, members or components, but do not preclude the presence or addition of one or more other features, elements, members or components.

In the embodiments of the present disclosure, the singular forms "a/an" and "the", etc. include plural forms, and should be understood broadly as "a kind of" or "a type of", but are not defined as the meaning of "one"; in addition, the term "the" should be understood to include both the singular forms and the plural forms, unless the context clearly indicates otherwise. In addition, the term "according to" should be understood as "at least partially according to . . . ", unless the context clearly indicates otherwise.

Embodiment 1

The EMBODIMENT 1 of the present disclosure provides an electronic device which may be, for example, an embedded electronic device or a programmable logic controller (PLC), etc.

Figure 1:
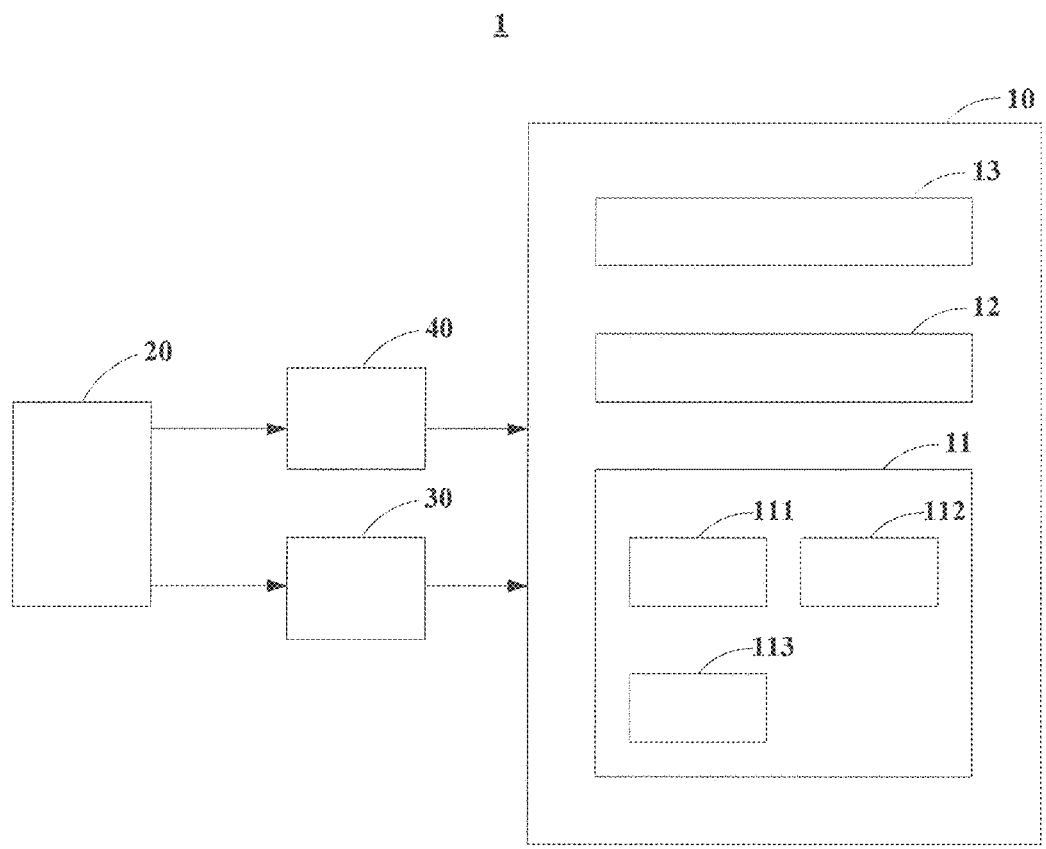
FIG. 1 is a schematic diagram of an electronic device in EMBODIMENT 1 of the present disclosure.

FIG. 1 is a schematic diagram of an electronic device in EMBODIMENT 1 of the present disclosure. As shown in FIG. 1, the electronic device 1 comprises: a control portion 10, a power supply portion 20, a power storage portion 30 and a power supply detection portion 40.

The control portion 10 comprises: a storage 11 and a controller 12.

The storage 11 is configured to store data which is, for example, data related to start-up and running of the electronic device 1, such as a firmware.

As shown in FIG. 1, the storage 11 may comprise: a first storage portion 111 and a second storage portion 112. The first storage portion 111 is configured to store start-up data for electronic device 1's start-up and the second storage portion 112 is configured to store running data for electronic device 1's running after start-up. For example, when the electronic device 1 is started up, firstly it is started up using the start-up data stored in the first storage portion 111, and then the start-up data stored in the first storage portion 111 is loaded with the running data of the second storage portion 112. Moreover, when data in the storage 11 is updated, the electronic device 1 can first be started up using the start-up data stored in the first storage portion 111, and then performs updating of the start-up data and/or running data.

The controller 12 can control the storage 11, so that processing of data updating in the storage 11 is proceeded or stopped. In addition, the controller 12 may also control other components in the electronic device 1 based on the data stored in the storage 11, so that the electronic device 1 completes a specific function which is e.g. a function as an embedded electronic device or a function as a programmable logic controller (PLC), etc.

The power supply portion 20 is capable of providing DC power, for example, the power supply portion 20 may have two power source output pins, the DC power outputted by the two power source output pins output has, for example, a 24V DC voltage.

The power storage portion 30 is electrically connected to the power supply portion 20 and is electrically connected to the control portion 10. The power storage portion 30 is capable of receiving power from the power supply portion 20 and storing the power, and providing the power to the control portion 10. For example, the power storage portion 30 may include at least one capacitance, two ends of the at least one capacitance may be connected in parallel between the two power source output pins of the power supply portion 20, and the two ends of the at least one capacitance may also be connected in parallel between two power source input pins of the control portion 10 for receiving power, thereby the capacitance may store the power outputted from the power supply portion 20 and provide the power to the power supply portion 10, and the power storage portion 30 may provide its own stored power to the control portion 10 if the power supply portion 20 has a power supply abnormality, such as an interruption in the power supply by the power supply portion 20, etc.

The power supply detection portion 40 can detect whether the power supply portion 20 supplies power normally or not. In addition, a detection signal of the power supply detection portion 40 may be sent to the control portion 10, for example, when the power supply detection portion 40 detects an interruption in the power supply by the power supply portion 20, a power outage signal is generated as the detection signal, and the power outage signal is sent to the control portion 10.

In the present embodiment, the start-up data in the first storage portion 111 and the running data in the second storage portion 112 of the storage 11 can be updated.

If the power supply detection portion 40 detects an abnormality in power supply by the power supply portion 20 during the process of updating the start-up data in the first storage portion 111, the controller 12 controls the storage 11 to complete the process of updating the start-up data using the power stored in the power storage portion 30. In this way, after the power supply section 20 restores normal power supply, the electronic device 1 can be started up using the start-up data after the update is completed.

Thereby, in the event of a failure of the power supply portion when the start-up data is updated, updating of the start-up data can be completed smoothly, thus ensuring that the electronic device 1 can be started up normally after the power supply portion 20 supplies power normally, and avoiding a situation in which an incomplete update causes the electronic device to fail to be started up properly again.

In the present embodiment, the power in the power storage portion 30 is capable of supporting the already started process of updating the start-up data to be able to continue and complete.

In the present embodiment, when the start-up data of the first storage portion 111 is not updated, if the power supply detection portion 40 detects an abnormality in power supply by the power supply portion 20, the controller 12 prohibits the storage 11 from starting an update of the start-up data using the power stored in the power storage portion 30. Thereby, interruption of the update of the startup data due to insufficient power in the power storage portion 30 can be avoided during the process of starting and performing the update of the start-up data using the power in the power storage portion 30.

Prohibiting, by the controller 12, the storage 11 from starting the update of the start-up data using the power stored in the power storage portion 30 may include: disconnecting, by the controller 12, the power supply from the power storage portion 30 to the storage 11, for example, the controller 12 may cause a switching element (not shown) between the power storage portion 30 and the storage 11 to turn off, thereby disconnecting the power supply from the power storage portion 30 to the storage 11; or, the controller 12 may control the first storage portion 111 such that the first storage portion 111 does not start up the update processing for the start-up data.

As shown in FIG. 1, the control unit 10 may further comprise: a communication unit 13. The communication unit 13 can receive start-up data for updates. The storage 11 may further comprise: a third storage portion 113. The third storage portion 113 is configured to store the start-up data for updates, received by the communication unit 13. Moreover, the controller 12 may also detect the start-up data for updates, stored in the third storage portion 113, thereby judging whether the startup data for updates is complete and/or valid. Data judged to be complete and/or valid by the controller 12 can be used to update the start-up data in the first storage portion 111.

In the present embodiment, in the process of receiving the start-up data for updates through the communication unit 13 and saving the start-up data for updates through the third storage portion 113, if the power supply detection portion 40 detects a power supply abnormality in the power supply portion 20, the controller 12 performs control to stop reception and saving of the start-up data for updates.

Figure 2:
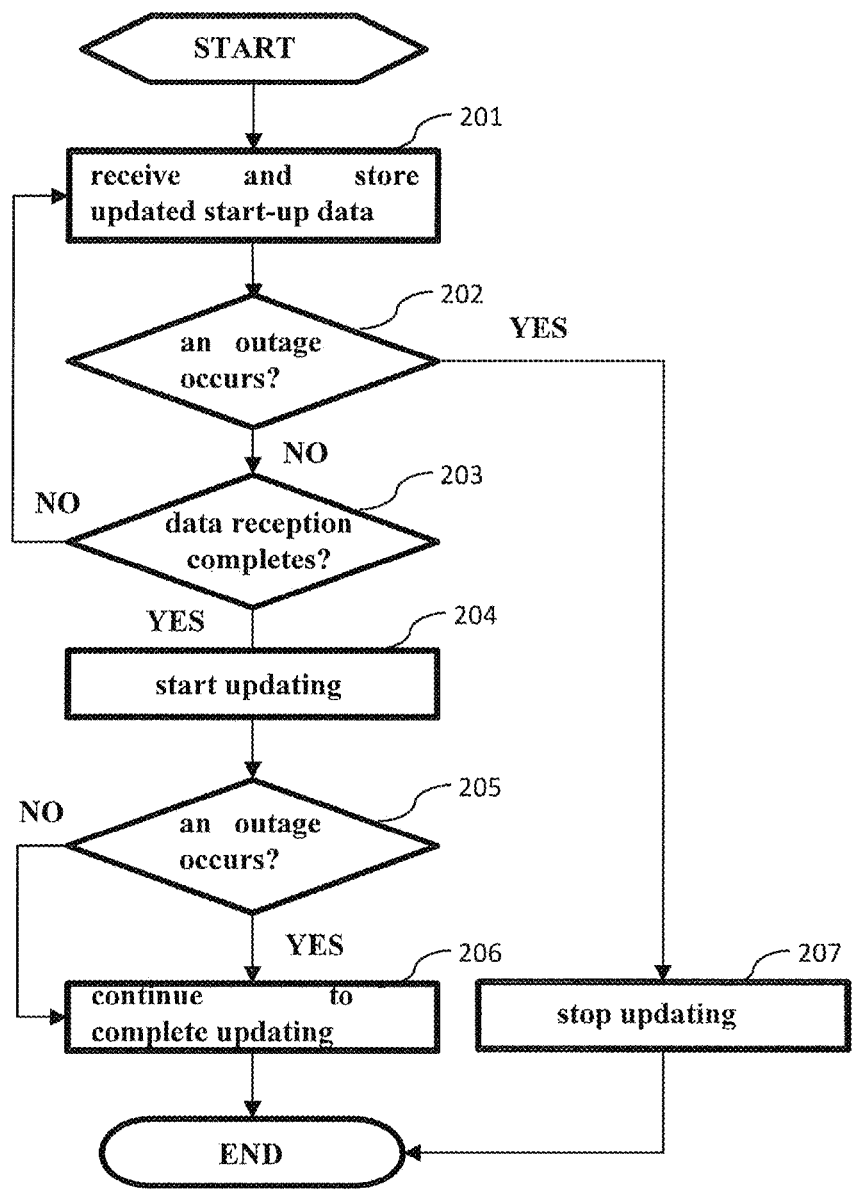
FIG. 2 is a schematic diagram of a process of updating start-up data of the electronic device 1.

FIG. 2 is a schematic diagram of a process of updating start-up data of the electronic device 1, as shown in FIG. 2, the process includes:

Operation 201, receiving and storing the start-up data for updates, for example the start-up data for updates is received by the communication unit 13 and is stored in the third storage portion 113;

Operation 202, detecting, by the power supply detection portion 40, whether a power outage occurs in the power supply portion 20, proceeding to the operation 207 if a detection result is "Yes" and to the operation 203 if the detection result is "No";

Operation 203, judging whether reception of the start-up data is complete, for example, the controller 12 judges whether the start-up data for updates in the third storage portion 113 is complete and/or valid, and if a judgment is "Yes", it indicates the reception of the start-up data is complete, proceeding to the operation 204, and if the judgment is "No", it indicates the reception of the start-up data is not completed yet, proceeding to the operation 201 to continue the reception and storage of the start-up data;

Operation 204, starting update of the start-up data, for example, the controller 12 performs control such that the start-up data for updates, stored in the third storage portion 113, updates the start-up data already present in the first storage portion 111;

Operation 205, detecting, by the power supply detection portion 40, whether a power outage occurs in the power supply portion 20, proceeding to the operation 206 if a detection result is "Yes" and also to the operation 206 if the detection result is "No";

Operation 206, continuing to update the start-up data until the update is completed, for example, if it is judged as "Yes" in the operation 205, the power supply portion 20 stops supplying power and the controller 12 performs control, so that the first storage portion 111 continues to update the start-up data using the remaining power stored in the power storage portion 30, and if it is judged as "No" in the operation 205, the power supply portion 20 supplies power normally and the controller 12 performs control, so that the first storage portion 111 continues to update the start-up data using the power continuously supplied to the power storage portion 30 by the power supply portion 20.

Operation 207, stopping receiving and storing the start-up data for updates.

In addition, if it is judged in the operation 203 that reception of the start-up data has been completed, and before the operation 204 starts updating of the start-up data, the power supply detection portion 40 detects a power outage in the power supply portion 20, then the control portion 12 performs control to prohibit the storage 11 from starting updating of the start-up data using the remaining power stored in the power storage portion 30.

In the present embodiment, the communication unit 13 may also receive running data for updates, and the third storage portion 113 may also store the running data for updates, wherein the running data for updates can update running data in the second storage portion 112.

In the present embodiment, in the process of receiving the running data for updates through the communication unit 13 and saving the start-up data for updates through the third storage portion 113, if the power supply detection portion 40 detects a power supply abnormality in the power supply portion 20, the controller 12 performs control to stop reception and saving of the running data for updates.

Moreover, if the power supply detection portion 40 detects a power supply abnormality in the power supply portion 20 in the process of updating the running data in the second storage portion 112, the controller 12 performs control to stop updating the running data in the second storage portion 112.

Figure 3:
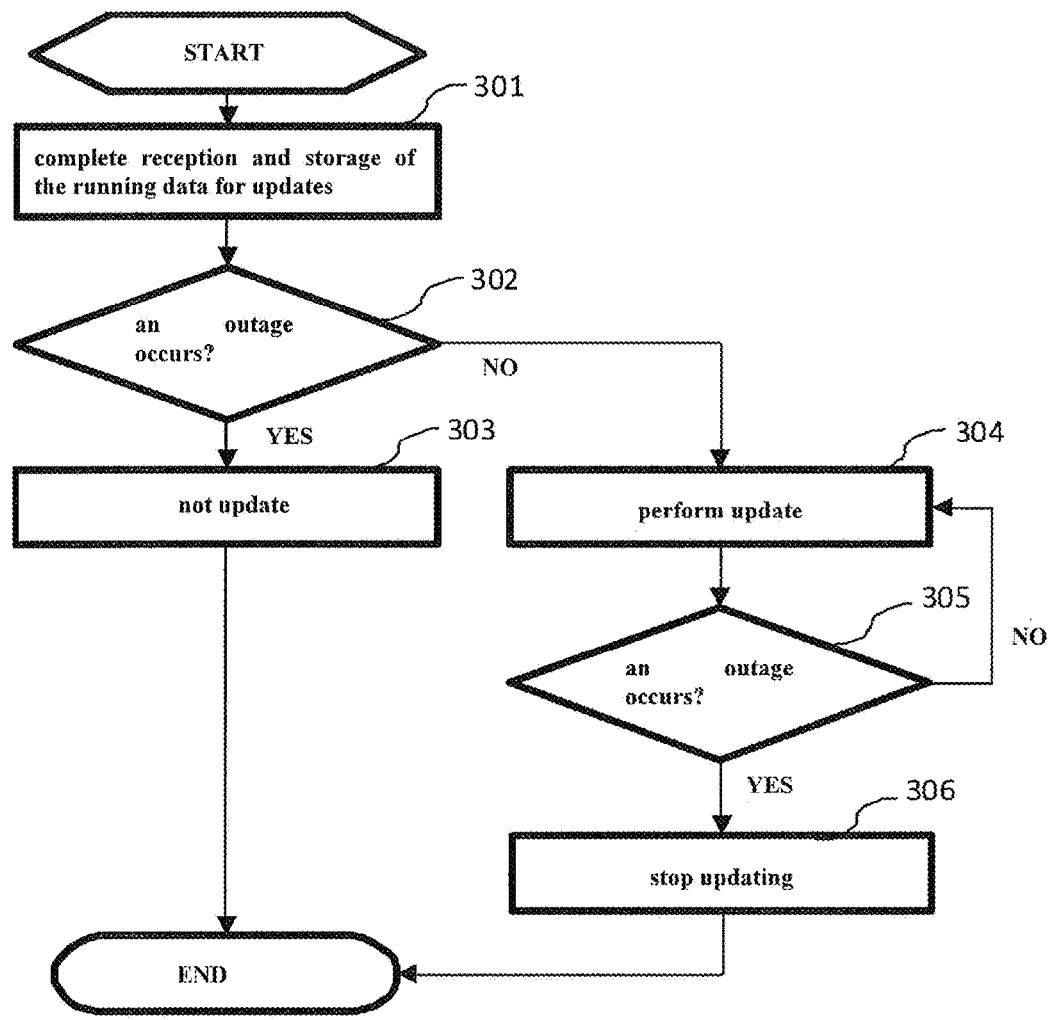
FIG. 3 is a schematic diagram of a process of updating running data of the electronic device 1.

FIG. 3 is a schematic diagram of a process of updating running data of the electronic device 1, as shown in FIG. 3, the process includes:

Operation 301, completing reception and storage of the running data for updates, for example the running data for updates is received by the communication unit 13 and is stored in the third storage portion 113;

Operation 302, detecting, by the power supply detection portion 40, whether a power outage occurs in the power supply portion 20, proceeding to the operation 303 if a detection result is "Yes" and to the operation 304 if the detection result is "No";

Operation 303, the storage 11 does not perform updating of the running data;

Operation 304, starting update of the running data, for example, the controller 12 performs control such that the running data for updates, stored in the third storage portion 113, updates the running data already present in the second storage portion 112;

Operation 305, detecting, by the power supply detection portion 40, whether a power outage occurs in the power supply portion 20, proceeding to the operation 306 if a detection result is "Yes" and returning to the operation 304 if the detection result is "No", and continuing update of the running data;

Operation 306, stopping updating of the running data, for example, the power supply portion 20 has a power outage and the storage 11 is also prohibited from continuing updating of the running data using the power stored in the power storage portion 30.

In addition, in the operation 304, whether updating of the running data is completed may also be judged: if a judgment result is "No", it indicates that updating of the running data has not been completed yet, the process enters the operation 305; if a judgment result is "Yes", it indicates that updating of the running data is completed, the processing skips the operation 305 and proceeds directly to "End".

According to EMBODIMENT 1 of the present disclosure, in the event of a failure of the power supply portion when the start-up data is updated, updating of the start-up data can be completed smoothly, thus ensuring that the electronic device 1 can be started up normally after the power supply portion 20 supplies power normally, and avoiding a situation in which an incomplete update causes the electronic device to fail to be started up properly again.

Embodiment 2

EMBODIMENT 2 of the present disclosure provides an electronic device.

Figure 4:
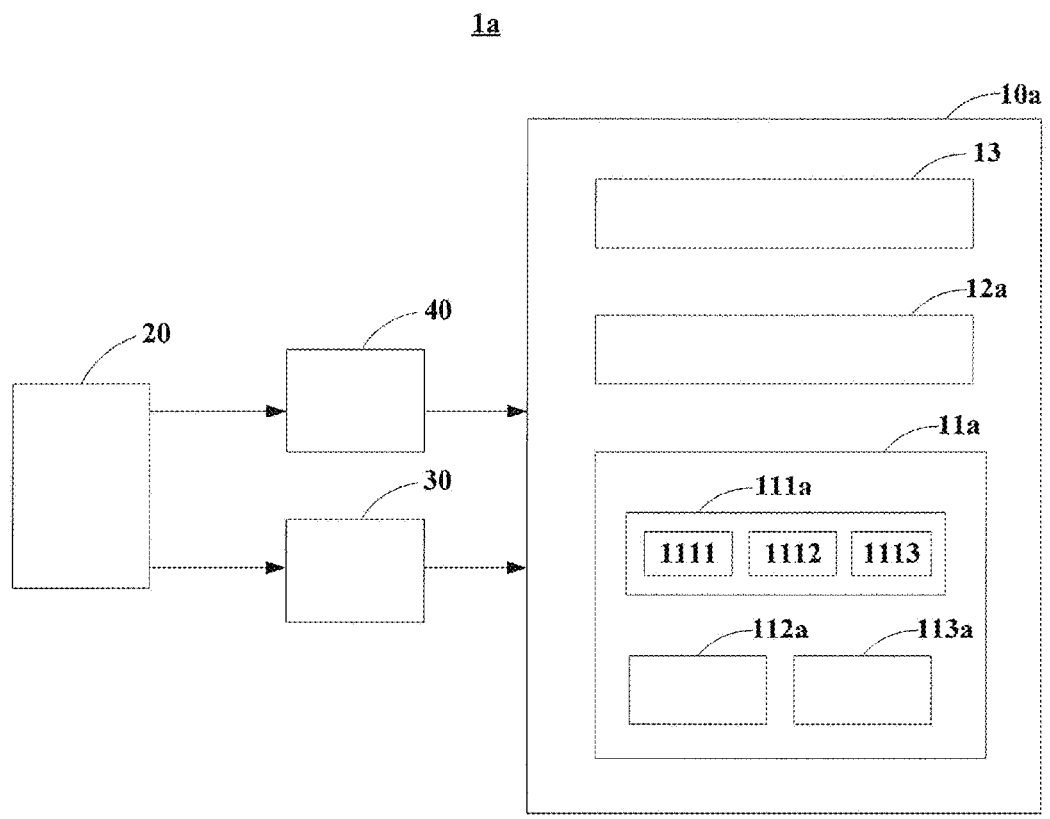
FIG. 4 is a schematic diagram of an electronic device in EMBODIMENT 2 of the present disclosure.

FIG. 4 is a schematic diagram of an electronic device in EMBODIMENT 2 of the present disclosure. As shown in FIG. 4, the electronic device 1a comprises: a control portion 10a, a power supply portion 20, a power storage portion 30 and a power supply detection portion 40.

The control portion 10a of the electronic device 1a in EMBODIMENT 2 is different from the control portion 10 of the electronic device 1 in EMBODIMENT 1. Moreover, the power supply portion 20, the power storage portion 30 and the power supply detection portion 40 of the electronic device 1a are the same as the power supply portion 20, the power storage portion 30 and the power supply detection portion 40 of the electronic device 1, respectively. Thus, descriptions of the power supply portion 20, the power storage portion 30 and the power supply detection portion 40 are omitted in EMBODIMENT 2.

As shown in FIG. 4, the control portion 10a comprises: a storage 11a and a controller 12a.

The storage 11a is configured to store data which is, for example, data related to start-up and running of the electronic device 1, such as a firmware.

As shown in FIG. 4, the storage 11a may comprise: a first storage portion 111a and a second storage portion 112a. The first storage portion 111a is configured to store start-up data for electronic device 1's start-up. The second storage portion 112a is configured to store running data for electronic device 1a's running after start-up.

The first storage portion 111a comprises: a first storage partition 1111 configured to store first start-up data; a second storage partition 1112 configured to store second start-up data; and a third storage partition 1113 configured to store switching data. The switching data is used to select the first start-up data stored in the first storage partition 1111 or the second start-up data stored in the second storage partition 1112 to start up the electronic device. Moreover, the third storage partition 1113 may also store a configuration related to start-up. For example, when the electronic device 1a is started up, it first starts up the third storage partition 1113, loads the first start-up data in the first storage partition 1111 or the second start-up data in the second storage partition 1112 according to the switching data in the third storage partition 1113, and then the first start-up data or the second start-up data loads running data of the second storage portion 112a. Moreover, when data in the storage 11a is updated, the electronic device 1a can first be started up using the start-up data stored in the first storage portion 111a, and then performs updating of the start-up data and/or running data.

The controller 12a can control the storage 11a, so that processing of data updating in the storage 11a is proceeded or stopped. In addition, the controller 12a may also control other components in the electronic device 1a based on the data stored in the storage 11a, so that the electronic device 1a completes a specific function which is e.g. a function as an embedded electronic device or a function as a programmable logic controller (PLC), etc.

In the present embodiment, the start-up data in the first storage portion 111a and the running data in the second storage portion 112a of the storage 11 can be updated. The start-up data stored in the first storage portion 111a includes: first start-up data, second start-up data and switching data.

In the present embodiment, in the case where the switching data selects one of the first start-up data and the second start-up data to start up the electronic device 1a, updating of the start-up data of the first storage portion 11a includes: updating the other one of the first start-up data and the second start-up data that is not selected by the switching data; and updating the switching data stored in the third storage partition 1113.

For example, in the case where the switching data selects the first start-up data to start up the electronic device 1a, updating of the start-up data of the first storage portion 11a includes: updating the second start-up data; and updating the switching data stored in the third storage partition 1113. For another example, in the case where the switching data selects the second start-up data to start up the electronic device 1a, updating of the start-up data of the first storage portion 11a includes: updating the first start-up data; and updating the switching data stored in the third storage partition 1113.

In the present embodiment, if the power supply detection portion 40 detects an abnormality in power supply by the power supply portion 20 during the process of updating the start-up data in the first storage portion 111a, the controller 12a controls the storage 11a to complete the process of updating the start-up data using the power stored in the power storage portion 30. In this way, after the power supply section 20 restores normal power supply, the electronic device 1a can be started up using the start-up data after the update is completed.

For example, if the power supply detection portion 40 detects a power supply abnormality in the power supply portion 20 during the process of updating the switching data, the controller 12a controls the third storage partition 1113 to complete the process of updating the switching data using the power stored in the power storage portion 30. Thereby, the power stored in the storage portion 30 may not be necessary for updating all the start-up data in the first storage portion 111a, but only for completion of updating the switching data, thus compared to EMBODIMENT 1, the power storage portion 30 in EMBODIMENT 2 can store less power, thereby reducing the cost of the power storage portion 30, for example, a capacitance value of a capacitance in the power storage portion 30 of EMBODIMENT 2 can be smaller.

In the present embodiment, when the switching data of the third storage partition 1113 is not updated, if the power supply detection portion 40 detects an abnormality in power supply by the power supply portion 20, the controller 12a prohibits the storage 11a from starting an update of the switching data using the power stored in the power storage portion 30. Thereby, interruption of the update of the switching data due to insufficient power in the power storage portion 30 can be avoided during the process of starting and performing the update of the switching data using the power in the power storage portion 30.

Prohibiting, by the controller 12a, the storage 11a from starting the update of the switching data using the power stored in the power storage portion 30 may include: disconnecting, by the controller 12a, the power supply from the power storage portion 30 to the storage 11a, for example, the controller 12a may cause a switching element (not shown) between the power storage portion 30 and the storage 11a to turn off, thereby disconnecting the power supply from the power storage portion 30 to the storage 11a; or, the controller 12a may control the third storage partition 1113 of the first storage portion 111a such that the third storage partition 1113 does not start up the update processing for the switching data.

As shown in FIG. 4, the control portion 10a may further comprise: a communication unit 13. The communication unit 13 can receive switching data for updates. The storage 11a may further comprise: a third storage portion 113a. The third storage portion 113a is configured to store the switching data for updates, received by the communication unit 13. Moreover, the controller 12a may also detect the switching data for updates, stored in the third storage portion 113a, thereby judging whether the switching data for updates is complete and/or valid. Data judged to be complete and/or valid by the controller 12a can be used to update the switching data in the third storage partition 1113 in the first storage portion 111a.

In the present embodiment, in the process of receiving the running data for updates through the communication unit 13 and saving the switching data for updates through the third storage portion 113a, if the power supply detection portion 40 detects a power supply abnormality in the power supply portion 20, the controller 12a performs control to stop reception and saving of the switching data for updates.

Figure 5:
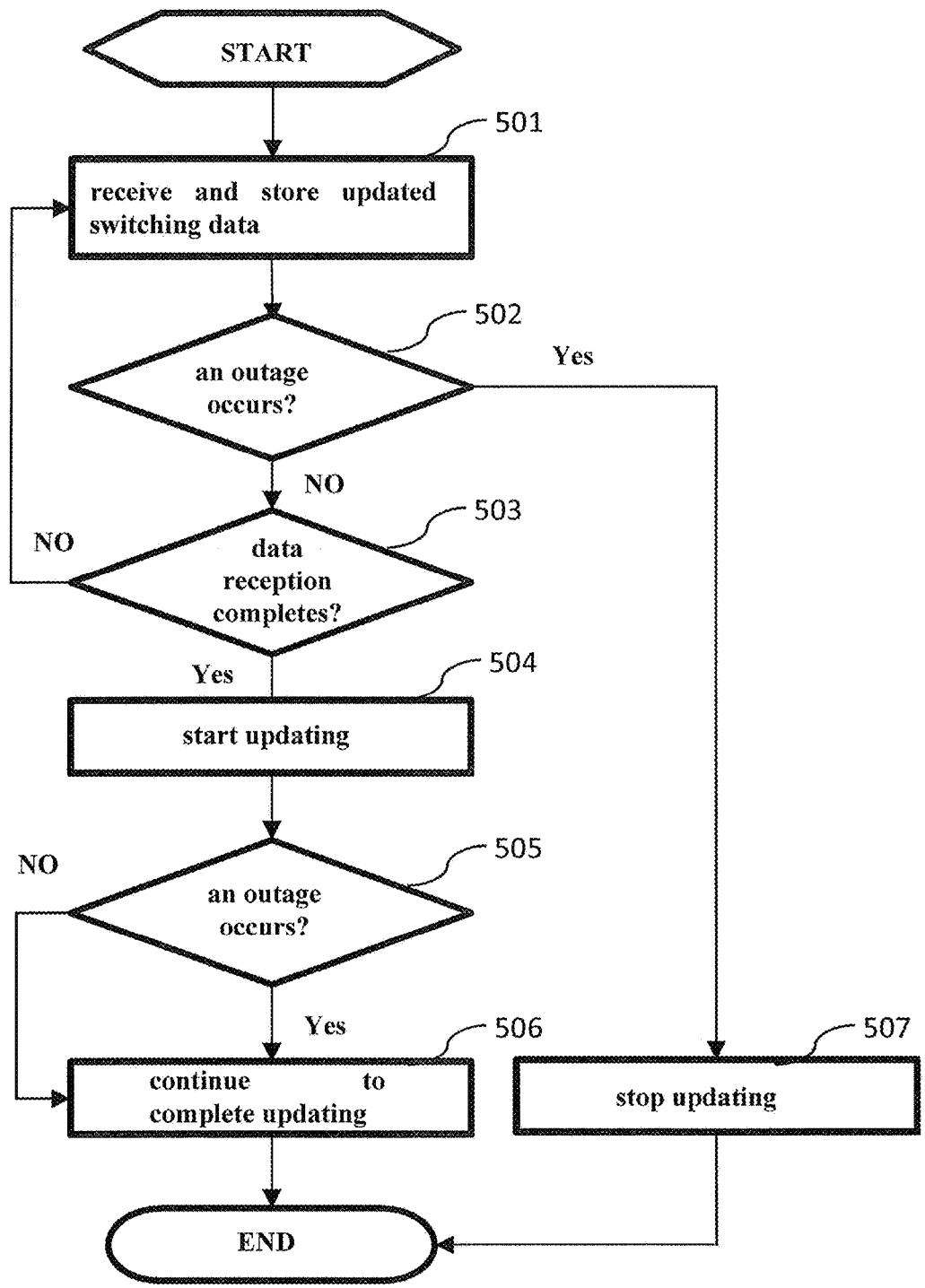
FIG. 5 is a schematic diagram of a process of updating switching data in start-up data of the electronic device 1*a*.

FIG. 5 is a schematic diagram of a process of updating switching data in start-up data of the electronic device 1a, as shown in FIG. 5, the process includes:

Operation 501, receiving and storing the switching data for updates, for example the switching data for updates is received by the communication unit 13 and is stored in the third storage portion 113a;

Operation 502, detecting, by the power supply detection portion 40, whether a power outage occurs in the power supply portion 20, proceeding to the operation 507 if a detection result is "Yes" and to the operation 503 if the detection result is "No";

Operation 503, judging whether reception of the switching data is complete, for example, the controller 12a judges whether the switching data for updates in the third storage portion 113a is complete and/or valid, and if a judgment is "Yes", it indicates the reception of the switching data is complete, proceeding to the operation 504, and if the judgment is "No", it indicates the reception of the switching data is not completed yet, proceeding to the operation 501 to continue the reception and storage of the start-up data;

Operation 504, starting update of the switching data, for example, the controller 12a performs control such that the switching data for updates, stored in the third storage portion 113a, updates the switching data already present in the third partition 1113 of the first storage portion 111a;

Operation 505, detecting, by the power supply detection portion 40, whether a power outage occurs in the power supply portion 20, proceeding to the operation 506 if a detection result is "Yes" and also to the operation 506 if the detection result is "No";

Operation 506, continuing to update the switching data until the update is completed, for example, if a detection result is "Yes" in the operation 505, the power supply portion 20 stops supplying power and the controller 12a performs control, so that the third partition 1113 of the first storage portion 111a continues to update the switching data using the remaining power stored in the power storage portion 30, and if the detection result is "No" in the operation 505, the power supply portion 20 supplies power normally and the controller 12a performs control, so that the third partition 1113 of the first storage portion 111a continues to update the switching data using the power continuously supplied to the power storage portion 30 by the power supply portion 20.

Operation 507, stopping receiving and storing the switching data for updates.

In addition, if it is judged in the operation 503 that reception of the switching data has been completed, and before the operation 504 starts updating of the switching data, the power supply detection portion 40 detects a power outage in the power supply portion 20, then the control portion 12a prohibits the storage 11a from starting updating of the switching data using the power stored in the power storage portion 30.

In the present embodiment, the communication unit 13 may also receive first start-up data or second start-up data for updates, and the third storage portion 113a may also store the first start-up data or the second start-up data for updates, wherein the first start-up data for updates is used for updating first start-up data already present in the first partition 1111, and the second start-up data for updates is used for updating second start-up data already present in the second partition 1112.

In the present embodiment, in the process of receiving the first start-up data or the second start-up data for updates through the communication unit 13 and saving the first start-up data or the second start-up data for updates through the third storage portion 113a, if the power supply detection portion 40 detects a power supply abnormality in the power supply portion 20, the controller 12a performs control to stop reception and saving of the first start-up data or the second start-up data for updates.

In the present embodiment, if the switching data selects one of the first start-up data and the second start-up data to start up the electronic device 1a, in the process of updating the other one of the first start-up data and the second start-up data: if the power supply detection portion 40 detects a power supply abnormality in the power supply portion 20, the controller 12a performs control so that the process of updating the other one stops; if the power supply portion 20 does not have a power supply abnormality, the controller 12a performs control so that the process of updating the other one is completed.

Moreover, after the process of updating the other one is completed and after the updating of the switching data stored in the third storage partition 1113 is completed, the updated switching data selects the updated other one to start up the electronic device 1a. For example, the switching data selects to start up the electronic device 1a from the first start-up data, and then the switching data is updated and the second start-up data is also updated, at this moment, when the electronic device 1a is started up again, the updated switching data selects to start up the electronic device 1a using the updated second start-up data.

In the present embodiment, the communication unit 13 may also receive running data for updates, and the third storage portion 113a may also store the running data for updates, wherein the running data for updates can update running data in the second storage portion 112a.

In the present embodiment, in the process of receiving the running data for updates through the communication unit 13 and saving the start-up data for updates through the third storage portion 113a, if the power supply detection portion 40 detects a power supply abnormality in the power supply portion 20, the controller 12a performs control to stop reception and saving of the running data for updates.

Moreover, if the power supply detection portion 40 detects a power supply abnormality in the power supply portion 20 in the process of updating the running data in the second storage portion 112a, the controller 12a performs control to stop updating the running data in the second storage portion 112a.

Figure 6:
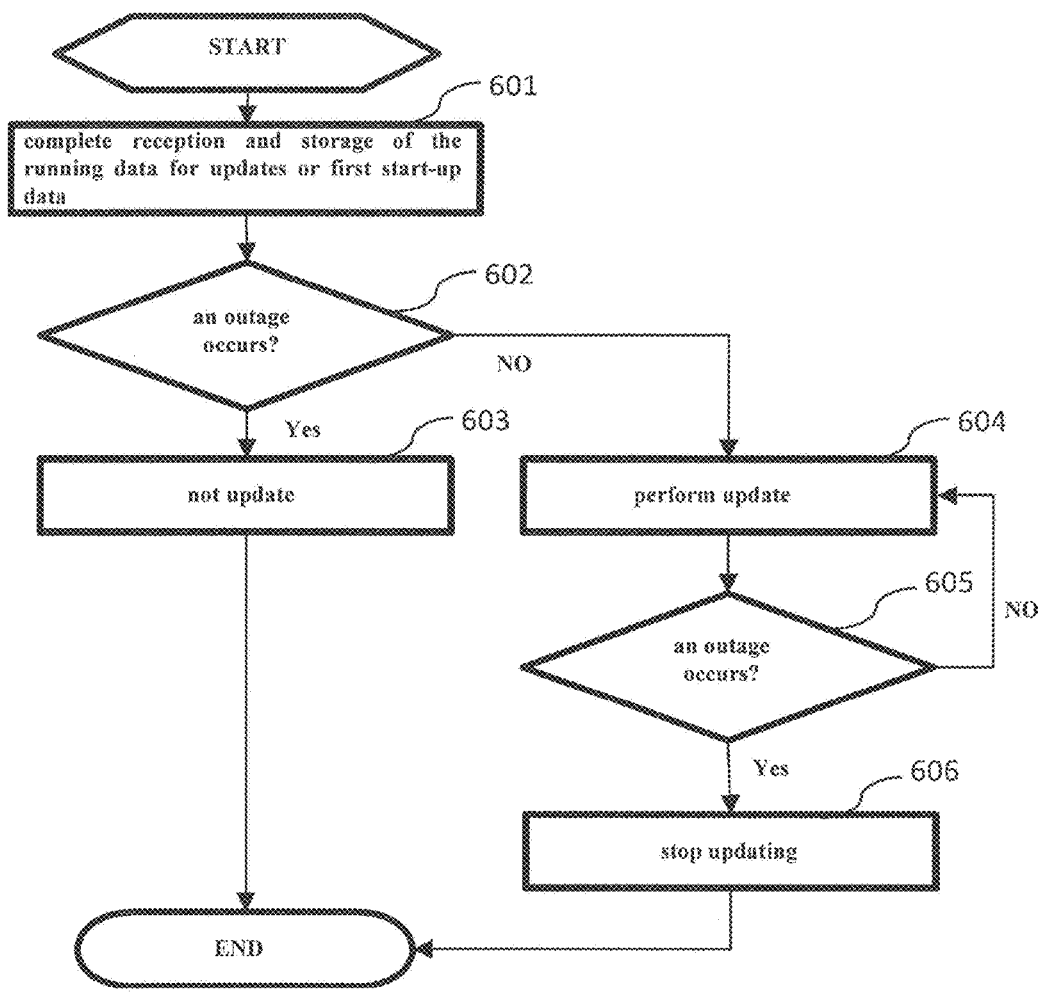
FIG. 6 is a schematic diagram of a process of updating running data or the other one of the electronic device 1*a*.

FIG. 6 is a schematic diagram of a process of updating running data or the other one of the electronic device 1a. In FIG. 6, the other one e.g., is the first start-up data. As shown in FIG. 6, the process comprises:

Operation 601, completing reception and storage of the running data for updates or the first start-up data for updates, for example the running data for updates or the first start-up data for updates is received by the communication unit 13 and is stored in the third storage portion 113a;

Operation 602, detecting, by the power supply detection portion 40, whether a power outage occurs in the power supply portion 20, proceeding to the operation 603 if a detection result is "Yes" and to the operation 604 if the detection result is "No";

Operation 603, the storage 11a does not perform updating of the running data or the first start-up data;

Operation 604, updating the running data or the first start-up data, for example, the controller 12a performs control such that the running data for updates, stored in the third storage portion 113a, updates the running data already present in the second storage portion 112a, or such that the first start-up data for updates, stored in the third storage portion 113a, updates the second start-up data already present in the second storage partition 1112 of the first storage portion 111a;

Operation 605, detecting, by the power supply detection portion 40, whether a power outage occurs in the power supply portion 20, proceeding to the operation 606 if a detection result is "Yes" and returning to the operation 604 if the detection result is "No", and continuing update of the running data or the first start-up data;

Operation 606, stopping updating of the running data or the first start-up data, for example, the power supply portion 20 has a power outage and the storage 11a is also prohibited from continuing updating of the running data or the first start-up data using the power stored in the power storage portion 30.

In addition, in the operation 604, whether updating of the running data or the first start-up data is completed may also be judged: if a judgment result is "No", it indicates that updating of the running data or the first start-up data has not been completed yet, the process enters the operation 605; if a judgment result is "Yes", it indicates that updating of the running data or the first start-up data is completed, the processing skips the operation 605 and proceeds directly to "End".

In the present embodiment, the third storage partition 1113 may be a register, the first storage partition 1111, the second storage partition 1112, the second storage portion 112a and the third storage portion 113a may be a read-only memory (ROM).

According to EMBODIMENT 2 of the present disclosure, in the event of a failure of the power supply portion when the switching data in the start-up data is updated, updating of the switching data can be completed smoothly, thus ensuring that the electronic device 1a can be started up normally after the power supply portion 20 supplies power normally, and avoiding a situation in which an incomplete update causes the electronic device to fail to be started up properly again; and, power stored in the power storage portion 30 can be less.

Embodiment 3

EMBODIMENT 3 of the present disclosure provides a method for controlling data updates of the electronic device. The method is used for controlling the electronic device 1 or 1a of EMBODIMENT 1 or 2.

Figure 7:
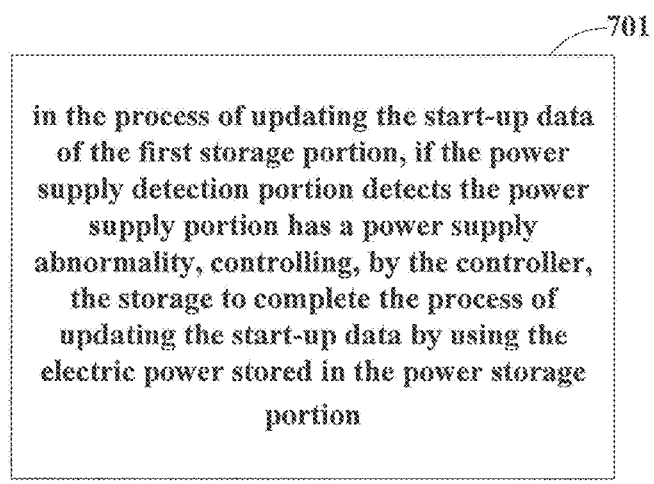
FIG. 7 is a schematic diagram of a method for controlling data updates of the electronic device in EMBODIMENT 3.

FIG. 7 is a schematic diagram of a method for controlling data updates of the electronic device in EMBODIMENT 3, as shown in FIG. 7, the method comprises:

Operation 701, in the process of updating the start-up data of the first storage portion, if the power supply detection portion detects the power supply portion has a power supply abnormality, controlling, by the controller, the storage to complete the process of updating the start-up data by using the electric power stored in the power storage portion.

According to the present embodiment, in the event of a failure of the power supply portion when the start-up data is updated, updating of the start-up data can be completed smoothly, thus ensuring that the electronic device 1a can be started up normally after the power supply portion 20 supplies power normally, and avoiding a situation in which an incomplete update causes the electronic device to fail to be started up properly again.

By combining with a controller described in the embodiments of the present disclosure, it can be directly reflected as hardware, a software executed by a processor, or a combination of the two. For example, one or more in the functional block diagram or one or more combinations in the functional block diagram as shown in the figures may correspond to software modules of a computer program flow, and may also correspond to hardware modules. These software modules may respectively correspond to the steps as shown in EMBODIMENT 3. These hardware modules can be realized by solidifying these software modules e.g. using a field-programmable gate array (FPGA).

A software module can be located in a RAM memory, a flash memory, a ROM memory, an EPROM memory, an EEPROM memory, a register, a hard disk, a mobile magnetic disk, a CD-ROM or a storage medium in any other form as known in this field. A storage medium can be coupled to a processor, thereby enabling the processor to read information from the storage medium, and to write the information into the storage medium; or the storage medium can be a constituent part of the processor. The processor and the storage medium can be located in an ASIC. The software module can be stored in a memory of a mobile terminal, and may also be stored in a memory card of the mobile terminal. For example, if the electronic device adopts a MEGA-SIM card with a larger capacity or a flash memory apparatus with a large capacity, the software module can be stored in the MEGA-SIM card or the flash memory apparatus with a large capacity.

One or more in the functional block diagram or one or more combinations in the functional block diagram as described in the figures can be implemented as a general-purpose processor for performing the functions described in the present disclosure, a digital signal processor (DSP), an application-specific integrated circuit (ASIC), a field-programmable gate array (FPGA) or other programmable logic device, discrete gate or transistor logic device, discrete hardware components or any combination thereof. One or more in the functional block diagram or one or more combinations in the functional block diagram as described in the figures can be also implemented as a combination of computer equipments, such as a combination of a DSP and a microprocessor, a plurality of microprocessors, one or more microprocessors combined and communicating with the DSP or any other such configuration.

The present disclosure is described by combining with the specific implementations, however persons skilled in the art should clearly know that these descriptions are exemplary and do not limit the protection scope of the present disclosure. Persons skilled in the art can make various variations and modifications to the present disclosure based on the principle of the present disclosure, these variations and modifications are also within the scope of the present disclosure.

The invention claimed is:

1. An electronic device, comprising:
a control portion including a storage configured to store data and a controller configured to control data updates in the storage;
a power supply portion;
a power storage portion configured to be connected with the power supply portion, receive and store electric power of the power supply portion, and supply the electric power to the control portion; and
a power supply detector which detects whether the power supply portion is supplying power,
the storage includes a first storage portion configured to store start-up data for electronic device start-up and a second storage portion configured to store running data for electronic device running after start-up,
in the process of updating the start-up data of the first storage portion, if the power supply detector detects the power supply portion has a power supply abnormality, the controller controls the storage to complete the process of updating the start-up data by using the electric power stored in the power storage portion,
wherein the first storage portion comprises:
a first storage partition, configured to store first start-up data;
a second storage partition, configured to store second start-up data; and
a third storage partition, configured to store switching data, the switching data being used to select the first start-up data stored in the first storage partition or the second start-up data stored in the second storage partition to start up the electronic device,
wherein in the case where the switching data selects to start up the electronic device from one of the first start-up data and the second start-up data,
an update of the start-up data of the first storage portion comprises:
updating other one of the first start-up data and the second start-up data, which is not selected by the switching data; and
updating the switching data stored in the third storage partition, and
wherein in the process of updating the switching data, if the power supply detector detects the power supply portion has a power supply abnormality, the controller controls the third storage partition to complete the process of updating the switching data by using the electric power stored in the power storage portion.

2. The electronic device according to claim 1, wherein,
when the start-up data of the first storage portion is not updated,
if the power supply detector detects the power supply portion has a power supply abnormality, the controller prohibits the storage from starting an update of the start-up data by using the electric power stored in the power storage portion.

3. The electronic device according to claim 1, wherein,
the control portion further comprises:
a communication unit, configured to receive start-up data for updates,
the storage further comprises:
a third storage portion, configured to store the start-up data for updates, received by the communication unit.

4. The electronic device according to claim 1, wherein,
in the process of updating the other one of the first start-up data and the second start-up data,
if the power supply detector detects the power supply portion has a power supply abnormality, the controller causes the process of updating the other one to stop.

5. The electronic device according to claim 1, wherein,
after updating the other one of the first start-up data and the second start-up data is completed, and after updating the switching data stored in the third storage partition is completed,
the updated switching data selects the updated first start-up data or the second start-up data to start up the electronic device.

6. A method for controlling data updates of an electronic device, the electronic device comprising:
a control portion including a storage configured to store data and a controller configured to control data updates in the storage;
a power supply portion;
a power storage portion configured to be connected with the power supply portion, receive and store first electric power of the power supply portion, and supply second electric power to the control portion; and
a power supply detector which detects whether the power supply portion is supplying power,
the storage includes a first storage portion configured to store start-up data for electronic device start-up and a second storage portion configured to store running data for electronic device running after start-up,
the method comprises:
in the process of updating the start-up data of the first storage portion, if the power supply detector detects the power supply portion has a power supply abnormality, controlling, by the controller, the storage to complete the process of updating the start-up data by using the electric power stored in the power storage portion,
wherein the first storage portion comprises:
a first storage partition, configured to store first start-up data;
a second storage partition, configured to store second start-up data; and
a third storage partition, configured to store switching data, the switching data being used to select the first start-up data stored in the first storage partition or the second start-up data stored in the second storage partition to start up the electronic device,
wherein in the case where the switching data selects to start up the electronic device from one of the first start-up data and the second start-up data,
an update of the start-up data of the first storage portion comprises:
updating other one of the first start-up data and the second start-up data, which is not selected by the switching data; and
updating the switching data stored in the third storage partition, and
wherein the method comprises:
in the process of updating the switching data, if the power supply detector detects the power supply portion has a power supply abnormality, controlling the third storage partition to complete the process of updating the switching data by using the electric power stored in the power storage portion.

7. The method according to claim 6, wherein,
when the start-up data of the first storage portion is not updated,
if the power supply detector detects the power supply portion has a power supply abnormality, the controller prohibits the storage from starting an update of the start-up data by using the electric power stored in the power storage portion.

* * * * *